Patented Sept. 6, 1938

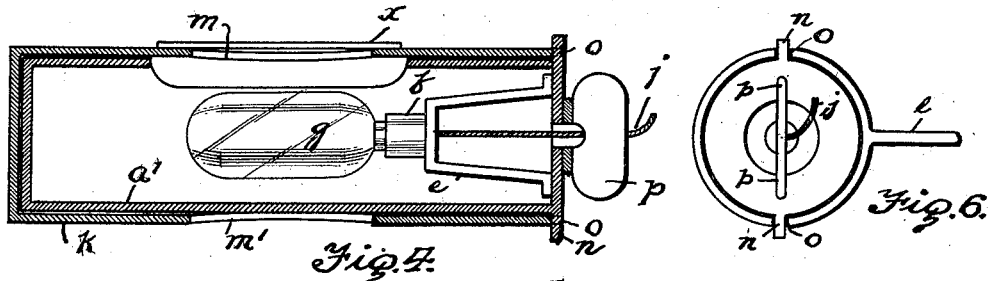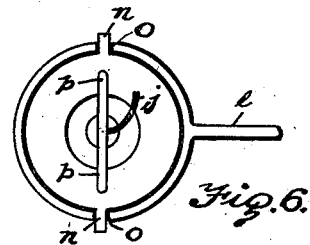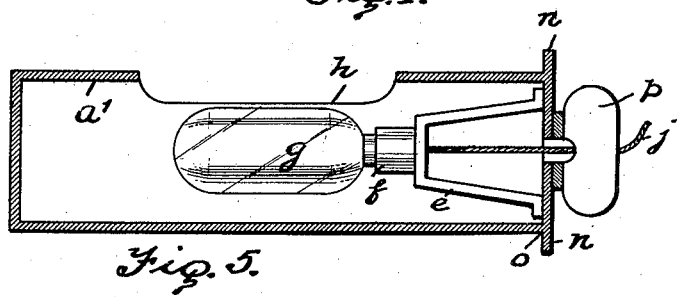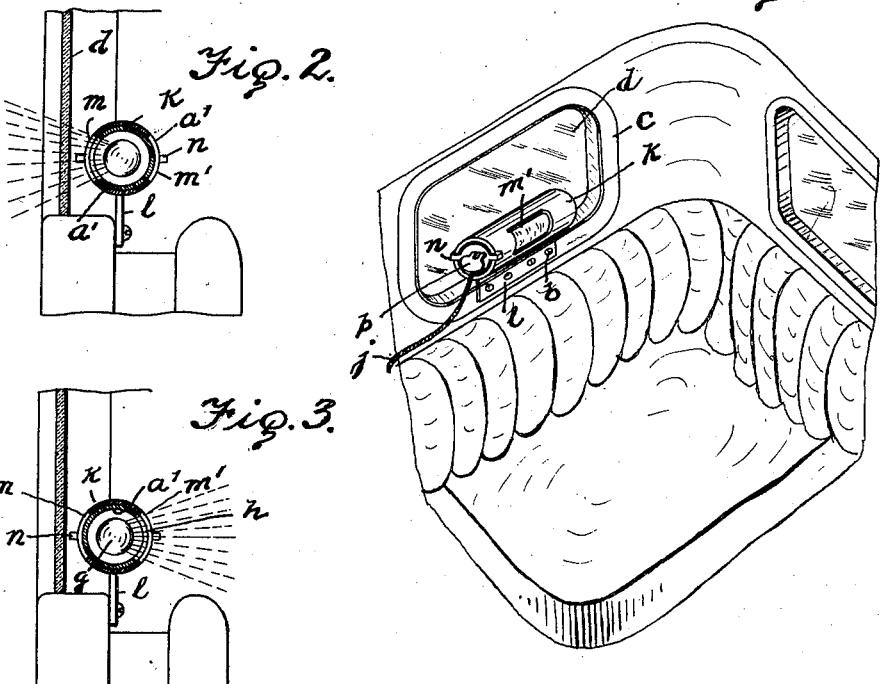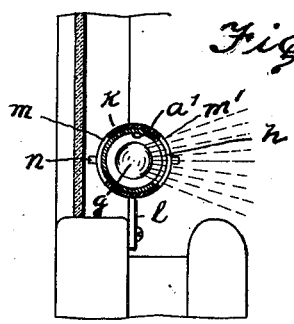

2,129,070

UNITED STATES PATENT OFFICE 2,129,070

SIGNALING AND LIGHTING INSTALLATION FOR MOTOR VEHICLES

Michael Röttinger, Mannheim, Germany

Application October 4, 1935, Serial No. 43,588
In Germany October 19, 1934

3 Claims. (Cl. 177—329)

This invention is directed to a lighting and signaling means for motor vehicles, being more particularly concerned with an element mounted within and at the rear of the vehicle to be visible through the rear window of the body and to be controlled by the occupant for signaling and lighting purposes as an indication to a following vehicle.

The primary object of the present invention is the provision of a signaling and lighting means involving a casing to be secured to the vehicle in proper position with respect to the rear window, within which casing is mounted a rotative hollow housing containing a fixed frame carrying a light socket, the housing being formed for rotation within the casing and capable of being temporarily locked or fixed in either one of two positions with respect to the casing, with the light from the lamp in the lamp socket delivered through a single opening in the housing and capable in the two positions of the housing relative to the casing to be displayed through an opening in the casing and directed toward the rear or to be displayed through an opening in the front of the casing and directed within the interior of the vehicle.

The invention is illustrated in the accompanying drawing, in which:

Figure 1 is a broken view of the interior of an automobile, with the signaling and lighting means in position.

Figure 2 is a broken vertical section of the same, the housing having been adjusted to direct the light rays through the rear of the vehicle.

Figure 3 is a similar view with the housing adjusted to direct the light rays through the front of the vehicle.

Figure 4 is an enlarged horizontal section, partly in elevation, with the housing adjusted to direct the light rays through the rear opening in the casing.

Figure 5 is a horizontal sectional view, partly in elevation, of the housing and carried parts.

Figure 6 is an end view of Figure 4.

As illustrated, the improved signaling and lighting means includes a casing $k$ provided with an extension $l$ by which it may be secured, as at $b$, to the frame $c$ of the rear window $d$ of an automobile. The casing is provided with a rear opening $m$ and a front opening $m'$ disposed in the same horizontal plane and one directed to the rear window $d$ and the other toward the interior of the vehicle.

A housing $a'$ having an exterior diameter corresponding approximately to the interior diameter of the casing is rotatably mounted in the casing, being passed through the open end thereof and extending to the opposite or closed end of the casing. Within the housing is mounted a frame $e$ in which is secured a lamp socket $f$ designed to receive a lamp $g$ with the parts arranged so that the light from the lamp is in line with an opening $h$ formed in one wall of the housing, which opening $h$ is so disposed that on rotation of the housing, the opening $h$ may be aligned with either opening $m$ or $m'$ in the casing.

The end wall $i$ of the housing to which the frame $e$ is secured is provided with diametrically opposed projections $n$ designed to fit in diametrically opposed notches $o$ in the wall of the casing at the open end. The end wall of the housing is provided with a finger-piece $p$ by which the housing may be rotated relative to the casing, the housing, when it is to be adjusted, being moved outwardly to disengage the projections $n$ from the notches $o$ and turned through a half revolution and moved inwardly to reengage the projections and notches to hold the housing temporarily in fixed position.

The lamp $g$ is energized through suitable conductors $j$, as illustrated.

In one position of the housing, the opening $h$ therein is aligned with the rear opening $m$ in the casing, the opposite opening $m'$ of the casing being closed by the imperforate wall of the housing, as illustrated in Figure 4. The light from the lamp is thus directed through the rear wall of the casing and the rear window $d$ of the automobile, as indicated in Figure 2, and, if desired, this rear opening of the housing may be provided with a plate $x$ carrying a signaling word or words which, when the lamp rays are directed therethrough, will indicate a desired signal to a following vehicle. When the housing is adjusted to the opposite position, as indicated in Figure 3, the rear opening $m$ in the casing is closed by the imperforate wall of the housing and the light rays are directed through the forward wall $m'$ of the casing to the interior of the vehicle, as indicated in Figure 3.

It is noted that the housing is completely removable from the casing by mere longitudinal movement of the housing to permit the housing to be used independently as a limited portable light for any of the many purposes for which the same may serve in connection with an automobile.

I claim:—

1. A signaling lamp including a casing open at one end and formed with oppositely disposed light emitting apertures in the wall thereof, said casing being designed to be secured as a fixture, a light tube rotatably and slidably mounted in the casing and having a light emitting opening designed in a predetermined rotative movement of the light tube to register with either light emitting opening of the casing, means in the light tube for supporting a lamp, means on the end of the light tube cooperating with means at the edge of the open end of the casing for fixing the light tube in different relative positions in the casing, said cooperating means on the end of the light tube in the open end of the casing fixing the casing and light tube against rotary movement, said means being separable to permit independent rotary movement of the light tube following slight longitudinal movement of the light tube through the open end of the casing.

2. A signaling lamp including a casing open at one end and formed in the wall thereof with diametrically opposed apertures, a light tube mounted for sliding and rotative movement in the casing, said tube being formed with an aperture designed to selectively register with either aperture in the casing on rotative movement of the tube, projections on one end of the tube to seat in notches in the edge of the casing at the open end thereof, means in the tube for supporting a lamp, and a handle at one end of the tube to permit the tube to be moved longitudinally in the casing to free the projections of the tube from the notches of the casing and rotate the tube to dispose the aperture therein in registry with either aperture of the casing at will, the subsequent cooperation of the projections and notches on relative endwise movement of the tube fixing the tube in desired position.

3. A construction as defined in claim 2, wherein the tube and contained parts are capable of complete removal from the casing to serve as an independent and movable light.

MICHAEL RÖTTINGER.